US012535995B2

(12) United States Patent
Li et al.

(10) Patent No.: US 12,535,995 B2
(45) Date of Patent: Jan. 27, 2026

(54) COMPUTER CODE GENERATION FROM TASK DESCRIPTIONS USING NEURAL NETWORKS

(71) Applicant: GDM Holding LLC, Mountain View, CA (US)

(72) Inventors: Yujia Li, London (GB); David Hugo Choi, London (GB); Junyoung Chung, London (GB); Nathaniel Arthur Kushman, Cambridge (GB); Julian Schrittwieser, London (GB); Rémi Leblond, Cachan (FR); Thomas Edward Eccles, London (GB); James Thomas Keeling, Haddenham (GB); Felix Axel Gimeno Gil, London (GB); Agustín Matías Dal Lago, London (GB); Thomas Keisuke Hubert, London (GB); Peter Choy, London (GB); Cyprien de Masson d'Autume, London (GB); Esme Sutherland Robson, Petworth (GB); Oriol Vinyals, London (GB)

(73) Assignee: GDM Holding LLC, Mountain View, CA (US)

( * ) Notice: Subject to any disclaimer, the term of this patent is extended or adjusted under 35 U.S.C. 154(b) by 168 days.

(21) Appl. No.: 18/105,211

(22) Filed: Feb. 2, 2023

(65) Prior Publication Data

US 2023/0244452 A1 Aug. 3, 2023

Related U.S. Application Data

(60) Provisional application No. 63/306,043, filed on Feb. 2, 2022.

(51) Int. Cl.
G06F 8/30 (2018.01)

(52) U.S. Cl.
CPC .................................. *G06F 8/30* (2013.01)

(58) Field of Classification Search
None
See application file for complete search history.

(56) References Cited

U.S. PATENT DOCUMENTS

| 8,972,930 B2* | 3/2015 | Gulwani | G06F 40/16 717/107 |
| 9,552,335 B2* | 1/2017 | Gulwani | G06F 8/427 |

(Continued)

FOREIGN PATENT DOCUMENTS

| JP | 2002182913 A | 6/2002 |
| JP | 2002251603 A | 9/2002 |

(Continued)

OTHER PUBLICATIONS

International Preliminary Report on Patentability in International Appln. No. PCT/EP2023/052595, dated Aug. 15, 2024, 13 pages.

(Continued)

*Primary Examiner* — Lewis A Bullock, Jr.
*Assistant Examiner* — Mark A Gooray
(74) *Attorney, Agent, or Firm* — Fish & Richardson P.C.

(57) ABSTRACT

Methods, systems, and apparatus, including computer programs encoded on computer storage media, for generating computer code using neural networks. One of the methods includes receiving description data describing a computer programming task; receiving a first set of inputs for the computer programming task; generating a plurality of candidate computer programs by sampling a plurality of output sequences from a set of one or more generative neural networks; for each candidate computer program in a subset of the candidate computer programs and for each input in the first set: executing the candidate computer program on the input to generate an output; and selecting, from the candi- (Continued)

date computer programs, one or more computer programs as synthesized computer programs for performing the computer programming task based at least in part on the outputs generated by executing the candidate computer programs in the subset on the inputs in the first set of inputs.

25 Claims, 5 Drawing Sheets

(56) References Cited

U.S. PATENT DOCUMENTS

| | | | |
|---|---|---|---|
| 10,831,451 B2* | 11/2020 | Udupa | G06F 8/10 |
| 2008/0282108 A1* | 11/2008 | Jojic | G06F 11/3624 714/26 |
| 2013/0283274 A1* | 10/2013 | Mimran | G06F 9/46 718/100 |
| 2013/0346982 A1* | 12/2013 | Kalai | G06N 20/00 718/100 |
| 2018/0275967 A1 | 9/2018 | Mohamed et al. | |
| 2019/0212989 A1* | 7/2019 | Polozov | G06F 8/35 |
| 2020/0301672 A1* | 9/2020 | Li | G06F 11/3608 |
| 2020/0364505 A1 | 11/2020 | Poole et al. | |
| 2021/0073330 A1* | 3/2021 | Inagaki | G06F 40/30 |
| 2021/0295822 A1* | 9/2021 | Tomkins | G06F 16/3338 |
| 2022/0138240 A1* | 5/2022 | Bahrami | G06F 16/3332 717/120 |
| 2022/0254006 A1* | 8/2022 | Jin | G06V 20/44 |
| 2023/0176829 A1* | 6/2023 | Rahmani | G06F 40/40 717/110 |
| 2024/0281226 A1* | 8/2024 | Zheng | G06F 8/41 |

FOREIGN PATENT DOCUMENTS

| | | |
|---|---|---|
| JP | 2015043140 A | 3/2015 |
| WO | WO 2023/148286 A1 | 8/2023 |

OTHER PUBLICATIONS

Adiwardana et al., "Towards a human-like open-domain chatbot," CoRR, Jan. 27, 2020, 38 pages.

Bonthu et al., "Text2PyCode: Machine Translation of Natural Language Intent to Python Source Code," 16th European Conference—Computer Vision, Aug. 28, 2020, 12844:51-60.

Budnik et al., "Guided test case generation through AI enabled output space exploration," 2018 IEEE/ACM 13th international workshop on automation of software test, May 28, 2018, 4:53-56.

Devlin et al., "Bert: Pre-training of deep bidirectional transformers for language understanding," CoRR, Oct. 11, 2018, arXiv:1810.04805, 16 pages.

Hong et al., "Latent Programmer; discrete latent codes for program synthesis," CoRR, Dec. 1, 2020, arXiv:2012.00377v1, 15 pages.

International Search Report and Written Opinion in International Appln. No. PCT/EP2023/052595, dated Apr. 19, 2023, 20 pages.

Raffel et al., "Exploring the limits of transfer learning with a unified text-to-text transformer," CoRR, Oct. 23, 2019, arXiv:1910.10683, 67 pages.

Triet et al., "Deep learning for source code modeling and generation: Models, applications and challenges," CoRR, Feb. 13, 2020, arXiv:2002.05442v1, 37 pages.

Vaswani et al., "Attention Is All You Need," CoRR, Jun. 12, 2017, arXiv:1706.03762, 15 pages.

Office Action in Australian Appln. No. 2023215615, mailed on Jul. 11, 2025, 3 pages.

Office Action in Canadian Appln. No. 3,243,657, mailed on Aug. 8, 2025, 8 pages.

Office Action in Japanese Appln. No. 2024-545992, mailed on Aug. 5, 2025, 6 pages (with English translation).

Gulwani, "Synthesis from Examples," 3rd Workshop on Advances on Model Based Software Engineering, Feb. 2012, 9 pages.

Le et al., "Interactive Program Synthesis," CoRR, Mar. 10, 2017, 13 pages.

Office Action in European Appln. No. 23703210.7, mailed on Aug. 12, 2025, 19 pages.

Pu et al., "Selecting Representative Examples for Program Synthesis," cs.Ai, Nov. 9, 2017, arXiv:1711.03243v3, 10 pages.

Shriver et al., "At the End of Synthesis: Narrowing Program Candidates," 2017 IEEE/ACM 39th International Conference on Software Engineering: New Ideas And Emerging Results Track, May 20, 2017, 13 pages.

Notice of Allowance in Japanese Appln. No. 2024-545992, mailed on Dec. 16, 2025, 5 pages (with English translation).

* cited by examiner

COMPUTER CODE GENERATION FROM TASK DESCRIPTIONS USING NEURAL NETWORKS

CROSS-REFERENCE TO RELATED APPLICATION

This application claims priority to U.S. Provisional Application No. 63/306,043, filed on Feb. 2, 2022. The disclosure of the prior application is considered part of and is incorporated by reference in the disclosure of this application.

BACKGROUND

This specification relates to generating computer code using neural networks.

Neural networks are machine learning models that employ one or more layers of nonlinear units to predict an output for a received input. Some neural networks include one or more hidden layers in addition to an output layer. The output of each hidden layer is used as input to the next layer in the network, e.g., the next hidden layer or the output layer. Each layer of the network generates an output from a received input in accordance with current values of a respective set of parameters.

SUMMARY

This specification describes a system implemented as computer programs on one or more computers in one or more locations that that generates computer program code using a neural network. In particular, the system receives an input that includes description data describing a computer programming task and generates as output one or more computer programs that, when executed, carry out the computer programming task described in the description data.

The subject matter described in this specification can be implemented in particular embodiments so as to realize one or more of the following advantages.

Generating code that solves a specified task requires searching in a huge structured space of possible computer programs, with a very sparse reward signal. For example, single character edits can completely change program behaviour even if they don't cause crashes, solutions can look dramatically different even for the same problem, and judging if a partial or incorrect program is useful is a difficult challenge. Thus, generating an entire program in a general-purpose programming language such as C++ or Python starting from a natural language task description has been an open problem.

This specification describes techniques for efficiently leveraging a set of one or more generative neural networks to accurately generate computer programs conditioned on natural language descriptions. In particular, the described techniques address the problem of searching the huge structured space by using generative neural networks, e.g., Transformer models, to generate a large set of program samples and then filtering, clustering, or both the results using corresponding inputs to obtain a small set of candidates to be proposed as synthesized computer programs. In some cases, to improve the diversity of the generated samples, the techniques make use of "metadata conditioning."

Moreover, the described system can pre-train the generative neural network on code sequences and then fine-tune on a set of task-specific data to ensure that the generative neural network can generate high-quality candidates even when the amount of task-specific training data is limited.

Additionally, the described approach is designed to be particularly efficient when implemented on parallel processing hardware. In particular, a system can perform the generating of the candidates and the sampling of the output sequences in parallel. For example, the system can use a plurality of parallel processing devices, e.g., CPUs, GPUs, TPUs, or other ASICs, FPGAs, and so on, to perform the generation and sampling in parallel. As a particular example, the system can deploy multiple instances of each of the one or more generative neural networks across the devices. For example, the system can deploy each instance on a different device or deploy an instance across multiple devices using model parallelism techniques. The system can then, for each instance, sample candidates as described above using the instance in parallel with each other instance. The system can further parallelize the code generation process by evaluating the candidates in parallel on the same devices on which they were generated.

One example method described herein is performed by one or more computers and comprises receiving description data describing a computer programming task, the description data comprising a plurality of text tokens; receiving a first set of inputs for the computer programming task; generating a plurality of candidate computer programs by sampling a plurality of output sequences from a set of one or more generative neural networks, wherein each generative neural network in the set is configured to receive an input sequence that includes the plurality of text tokens in the description data and to process the input sequence to generate an output sequence comprising a plurality of computer code tokens that specifies a candidate computer program for performing the computer programming task described by the description data; for each candidate computer program in a subset of the candidate computer programs and for each input in the first set: executing the candidate computer program on the input to generate an output; and selecting, from the candidate computer programs, one or more computer programs as synthesized computer programs for performing the computer programming task based at least in part on the outputs generated by executing the candidate computer programs in the subset on the inputs in the first set of inputs.

The method may comprise receiving a new input for the computer programming task; and executing one or more of the synthesized computer programs on the new input to generate an output for the computer programming task for the new input. The method may further comprise: receiving, for each input in the first set, a respective expected output generated by performing the computer programming task on the input. The selecting may comprise: for each candidate computer program in the subset and for each input in the first set: determining whether the output generated by executing the candidate computer program on the input matches the respective expected output for the input; selecting, as an initial set of computer programs, only candidate computer programs that, for each input in the first set, generated an output that matched the respective expected output for the input when executed on the input; selecting, as a synthesized computer program, one or more respective computer programs from the initial set of computer programs. The subset of candidate computer programs may include all of the plurality of candidate computer programs.

The selecting may comprise clustering the candidate computer programs in the subset into a plurality of clusters based on the outputs generated by executing the candidate computer programs on the inputs in the first set; and selecting, as a synthesized computer program, one or more respective candidate computer programs from each of one or more of the clusters. Selecting, as at least one of the synthesized computer programs, one or more respective computer programs from each of one or more of the clusters may comprise: selecting, as at least one of the synthesized computer programs, one or more respective computer programs from each of a predetermined number of largest clusters of the plurality of clusters. Obtaining the first set of inputs for the computer programming task may comprise: processing one or more description sequences that each include the plurality of text tokens from the description data using a test input generation neural network that is configured to process each description sequence to generate as output one or more test inputs for the computer programming task described by the description sequence. In an example, the subset of candidate computer programs may include only candidate computer programs that were not filtered out from the plurality of candidate computer programs based on, for each candidate computer program and for each input in a second set of inputs, whether the output generated by executing the candidate computer program on the input matched a respective expected output for the input.

The set of one or more generative neural networks may include only a single generative neural network. Alternatively, the set of one or more generative neural networks may include a plurality of generative neural networks. Each generative neural network in the set may have a different combination of values for a set of one or more properties than each other neural network in the set. The properties may include one or more of (i) training data used to train the generative neural network, (ii) a number of parameters of the generative neural network, or (iii) a sampling temperature for sampling output sequences from the generative neural network. One or more of the generative neural networks in the set may include: an encoder neural network configured to process the input sequence to generate an encoded representation of the input sequence; and a decoder neural network configured to process the encoded representation to generate the output sequence. An encoder neural network in the set may be a Transformer encoder that applies self-attention over the input sequence. A decoder neural network in the set may be an auto-regressive Transformer decoder that applies cross-attention into the encoded representation.

Generating a plurality of candidate computer programs by sampling a plurality of output sequences from a set of one or more generative neural networks may comprise repeatedly performing operations comprising: generating a current input sequence from the description data; and sampling one or more output sequences by processing the current input sequence using one of the generative neural networks in the set. The operations may be performed in parallel across a plurality of hardware devices. Each input sequence may comprise the plurality of text tokens from the description data and one or more tokens identifying a programming language. Generating a current input sequence from the description data may comprise: sampling a programming language from a distribution over a set of programming languages; and including one or more tokens identifying the programming language in the current input sequence.

Each input sequence may comprise the plurality of text tokens from the description data and one or more tokens indicating whether the output sequence generated by the generative neural network should specify a correct or incorrect solution for the computer programming task. Generating a current input sequence from the description data may comprise: including one or more tokens indicating that the output sequence generated by the generative neural network should specify a correct solution for the computer programming task.

Each input sequence may comprise the plurality of text tokens from the description data and zero or more tags that each comprise one or more tokens and that identify an algorithm that should be implemented by the output sequence generated by the generative neural network. Generating a current input sequence from the description data may comprise: sampling one or more tags from a distribution over a set of tags; and including the sampled tags in the current output sequence.

Each input sequence may comprise the plurality of text tokens from the description data and one or more tokens that specify a difficulty rating for the computer programming task. Generating a current input sequence from the description data may comprise: selecting a difficulty rating for the computer programming task; and including one or more tokens specifying the selected difficulty rating in the current output sequence. Selecting a difficulty rating for the computer programming task may comprise selecting a fixed difficulty rating that is the same for all computer programming tasks after training of the generative neural networks. Selecting a difficulty rating for the computer programming task may comprises sampling a difficulty rating from a distribution over a set of difficulty ratings.

Each generative neural network may have been pre-trained on a language modeling objective on a first set of training data and fine-tuned on a code generation objective on a second set of training data that includes a plurality of training examples that each include (i) a training input sequence representing a computer programming task and (ii) a training output sequence that represents a computer program. The first set of training data may comprise a set of sequences that each represent a segment of computer code. The plurality of training examples may include a first subset of training examples for which the training output sequence in the training example is a correct solution to the computer programming task represented by the training input sequence in the training example and a second set of training examples for which the training output sequence in the training example is not a correct solution to the computer programming task represented by the training input sequence in the training example. The code generation objective may be GOLD with tempering.

The text tokens and the computer code tokens may be selected from a same vocabulary of tokens.

An example system described herein comprises one or more computers and one or more storage devices storing instructions that when executed by the one or more computers cause the one more computers to perform the operations of any method described herein.

In another example described herein, one or more computer storage media store instructions that when executed by one or more computers cause the one more computers to perform the operations of any method described herein.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
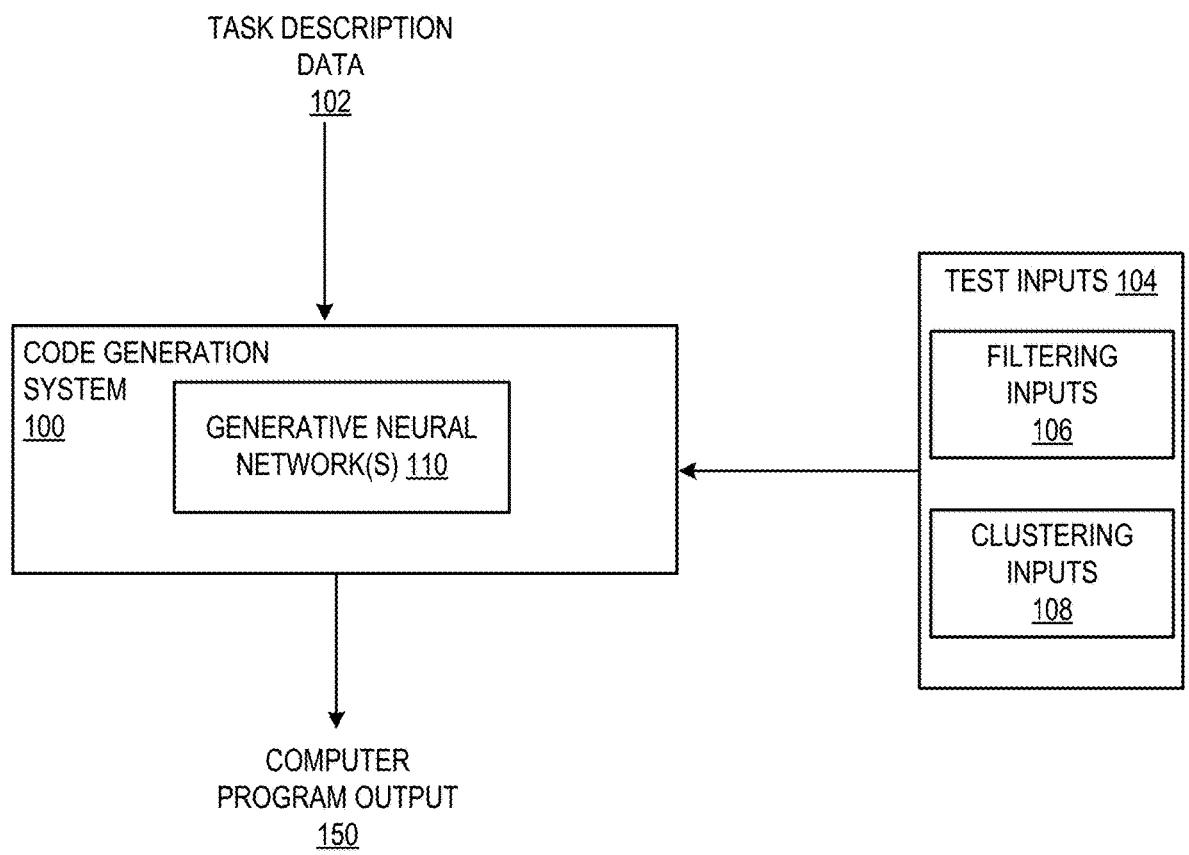
FIG. 1 is a diagram of an example code generation system.

FIG. 1 is a diagram of an example code generation system 100. The code generation system 100 is an example of a system implemented as computer programs on one or more computers in one or more locations, in which the systems, components, and techniques described below can be implemented.

The system 100 generates computer program code in response to received requests using a neural network 110. In particular, in response to a given request, the system 100 generates one or more synthesized computer programs 150 that, when executed, perform a computer programming task that is specified in the request.

In particular, the system 100 receives description data 102 describing a computer programming task, i.e., describing the type of output that should be generated by executing a computer program on an input for the task.

Generally, the description data 102 includes natural language text describing the intended function of the computer program that is to be generated by the system 100. For example, the system 100 can receive natural language text as input from a user and generate the description data 102 from the natural language text.

The natural language text can be represented as a sequence of text tokens, e.g., tokens representing one or more of: characters, bytes, word pieces, words, punctuation marks, and so on.

For example, the system 100 can generate the sequence from a natural language input by applying a tokenizer, e.g., the SentencePiece tokenizer or another tokenizer, to divide the natural language input into tokens from the vocabulary.

For example, the system 100 can train the tokenizer on data that included a mix of natural language text sequence and computer code segments in a variety of programming languages, e.g., e.g., Python, C++, C#, Java, Ruby, PHP, and so on, to ensure that the tokenizer can effectively tokenize programs from a range of programming languages, as well as the natural language descriptions of tasks that are received as input by the system 100.

The system 100 also obtains one or more sets of inputs 104 for the computer programming task. Each set of inputs 104 satisfies the requirements for inputs to the computer programming task, e.g., includes a respective value for each input variable that is required to perform the task. As a simplified example, when the task that is described by the description 102 requires sorting a set of input numbers, each input will include a set of numbers to be sorted.

In particular, the system 100 can obtain (i) a set of filtering inputs 106, (ii) a set of clustering inputs 108, or (iii) both.

The set of filtering inputs 106 includes a set of inputs and, for each input, a respective expected output generated by performing the computer programming task on the input. The filtering input—expected output pairs can be received as input by the system 100, e.g., from a user along with the description data.

The set of clustering inputs 108 includes a set of inputs for the computer programming task, but does not require that there be any expected outputs for the inputs.

As is described in more detail below, in some implementations, the system 100 generates some or all of the clustering inputs 108 from the description data 102 using a test input generation neural network.

The system 100 then generates a plurality of candidate computer programs using the description data 102.

In particular, the system 100 can generate the candidate output programs by sampling a plurality of output sequences from a set of one or more generative neural networks 110.

Each generative neural network 110 in the set is configured to receive an input sequence that includes the plurality of text tokens in the description data 102 and to process the input sequence to generate an output sequence that includes a plurality of computer code tokens that specifies a candidate computer program for performing the computer programming task described by the description data.

Each computer code token is selected from a vocabulary of tokens that represent code symbols in one or more computer programming languages, e.g., Python, C++, C#, Java, Ruby, PHP, and so on. For example, the vocabulary of tokens can be the same as the input vocabulary of tokens described above, e.g., the vocabulary employed by the tokenizer described above.

The neural network(s) 110 can have any appropriate neural network architecture that allows the model to map an input sequence of tokens from a vocabulary to an output sequence of tokens from the vocabulary.

For example, each neural network 110 can have an encoder-decoder architecture, e.g., an architecture with a Transformer encoder that applies self-attention over the input sequence to generate an encoded representation of the input sequence and a Transformer decoder that applies cross-attention into the output of the Transformer.

In particular, each neural network 110 can be an auto-regressive neural network that auto-regressively generates the output sequence of tokens by generating each particular token in the output sequence conditioned on a current input sequence that includes (i) the input sequence followed by (ii) any text tokens that precede the particular text token in the output sequence.

More specifically, to generate a particular token, the neural network 110 can process the current input sequence to generate a score distribution, e.g., a probability distribution, that assigns a respective score, e.g., a respective probability, to each token in the vocabulary of text tokens. For example, the penultimate layer of the neural network 110 can generate a score ("log it") for each token in the vocabulary and the final layer of the neural network 110 can be a softmax layer that maps the scores for the tokens to a probability distribution.

The neural network 110 can then select, as the particular text token, a text token from the vocabulary using the score distribution. For example, the neural network 110 can greedily select the highest-scoring token or can sample, e.g., using top-k sampling, nucleus sampling or another sampling technique, a token from the distribution.

Generally, because the neural network 110 is auto-regressive, by sampling from a distribution at each time step the system 100 can use the same neural network 110 to generate multiple different candidate output sequences in response to the same input. That is, by sampling tokens rather than selecting only the highest-scoring tokens, the system 100 introduces stochasticity into the generation process and can generate different sequences by processing the same input multiple times in parallel or sequentially.

Examples of auto-regressive Transformer architectures that can be used for the neural network 110 include those described in Colin Raffel, Noam Shazeer, Adam Roberts, Katherine Lee, Sharan Narang, Michael Matena, Yanqi Zhou, Wei Li, and Peter J Liu. Exploring the limits of transfer learning with a unified text-to-text transformer. arXiv preprint arXiv:1910.10683, 2019; Daniel Adiwardana, Minh-Thang Luong, David R. So, Jamie Hall, Noah Fiedel, Romal Thoppilan, Zi Yang, Apoorv Kulshreshtha, Gaurav Nemade, Yifeng Lu, and Quoc V. Le. Towards a human-like open-domain chatbot. CoRR, abs/2001.09977, 2020; and Ashish Vaswani, Noam Shazeer, Niki Parmar, Jakob Uszkoreit, Llion Jones, Aidan N. Gomez, Lukasz Kaiser, Illia Polosukhin Attention Is All You Need. arXiv preprint arXiv: 1706.03762, 2017.

In some implementations, the architecture of the generative neural network(s) 110 can be modified relative to those described above to facilitate efficient sampling. For example, the generative neural network(s) 110 can employ multi-query attention instead of multi-head attention. In multi-query attention, each attention head within the encoder, the decoder, or both has different queries but shares the keys and the values. Because the key and values are shared, the sampling efficiency is improved and the number of parameters of the neural network 110 is reduced. In particular, memory usage and cache-updated costs, each of which represents a potential bottleneck during sampling, may be reduced through use of multi-query attention.

Table 1 shows some example hyperparameters of an encoder-decoder Transformer with multi-query attention or with multi-head attention that can be used for the neural network 110.

TABLE 1

| | | Heads | | Blocks | | Training | | |
|---|---|---|---|---|---|---|---|---|
| $n_{params}$ | $d_{model}$ | Query | KV | Enc | Dec | Batch | Steps | Tokens |
| 284M | 768 | 6 | 1 | 4 | 24 | 256 | 600k | 354 B |
| 1.1 B | 1408 | 11 | 1 | 5 | 30 | 256 | 1000k | 590 B |
| 2.8 B | 2048 | 16 | 1 | 6 | 36 | 512 | 700k | 826 B |
| 8.7 B | 3072 | 24 | 4 | 8 | 48 | 1024 | 530k | 1250 B |
| 41.1 B | 6144 | 48 | 16 | 8 | 56 | 2048 | 205k | 967 B |

This table lists the total number of parameters in the model $n_{params}$, the hidden dimension of the transformer blocks $d_{model}$, the number of query and key-value (KV) heads, the number of transformer blocks in the encoder (enc) and decoder (dec), the training batch size, the number of gradient update steps, and the number of total training tokens. All of these example configurations share a head size of 128 and a feed-forward fan-out ratio of 6.

When there are multiple neural networks 110 in the set of generative neural networks 110, each generative neural network 110 has a different combination of values for a set of one or more properties than each other neural network 110 in the set. For example, the properties can include one or more of (i) training data used to train the generative neural network 110, (ii) initialized values of the parameters of the generative neural network 110 prior to training the generative neural network 110, (ii) a number of parameters of the generative neural network 110, or (iii) a sampling temperature for sampling output sequences from the generative neural network 110. Sampling temperatures will be described in more detail below.

By ensuring that each neural network 110 in the set has different combination of values for this set of properties, the system 100 can ensure that the neural networks 110 can be used to generate a diverse set of outputs for a given input.

For each candidate computer program in a subset of the candidate computer programs generated using the neural network(s) 110 and for each input in the one or more sets of inputs 104, the system 100 executes the candidate computer program on the input to generate an output.

The system 100 can execute a computer program in any of a variety of ways.

For example, the system 100 can compile a given candidate computer program into an executable using an appropriate compiler and then cause a computer to execute the machine instructions in the executable.

As another example, the system 100 can execute the given candidate computer program using an appropriate interpreter that translates and executes the code in the computer program.

If a candidate program fails to compile or cannot be interpreted by the interpreter, the system 100 can remove the candidate program from consideration.

The system 100 then selects, from the candidate computer programs, one or more computer programs as synthesized computer programs 150 for performing the computer programming task based at least in part on the outputs generated by executing the candidate computer programs in the subset on the inputs in the one or more sets of inputs 104. That is, the system uses the one or more sets of inputs 104 to "filter" the set of candidate computer programs to result in the one or more synthesized computer programs 150.

This filtering will be described in more detail below with reference to FIG. 2A.

Once the system 100 has selected the one or more computer programs 150, the system 100 can use the selected program(s) for any of a variety of tasks.

For example, the system 100 can provide the source code of each selected computer program 150 for presentation to a user in a user interface, e.g., to allow the user to select one of the selected computer programs for inclusion in a larger computer program being programmed by the user or to select one of the selected computer programs for modification prior to being used to perform the task.

As another example, the system 100 can directly use the selected computer program(s) to perform the task. For example, the system 100 can receive a new input for the computer programming task, e.g., submitted by a user through user interface, provided by another computer program running on the same computer or on a remote computer, or received through an application programming interface (API) provided by the system 100, and execute one or more of the synthesized computer programs 150 on the new input to generate an output for the computer programming task for the new input. The system 100 can then provide one or more of the generated outputs as an output for the task. For example, when there is only a single selected computer program 150 or when each computer program 150 generates the same output, the system 100 can provide the single output as the output for the task. When there are multiple computer programs selected and the programs generated different outputs, the system 100 can provide the output generated by the largest number of programs as the output for the task.

Prior to using the neural network(s) 110 to generate synthesized computer programs, the system 100 or another training system trains the neural network(s) 110 on training data. In some cases, as will be described in more detail below, the training system first pre-trains the neural network(s) 110 on computer code sequences and then fine-tunes the neural network(s) 110 on a code generation objective that requires generating code from task descriptions.

Figure 2A:
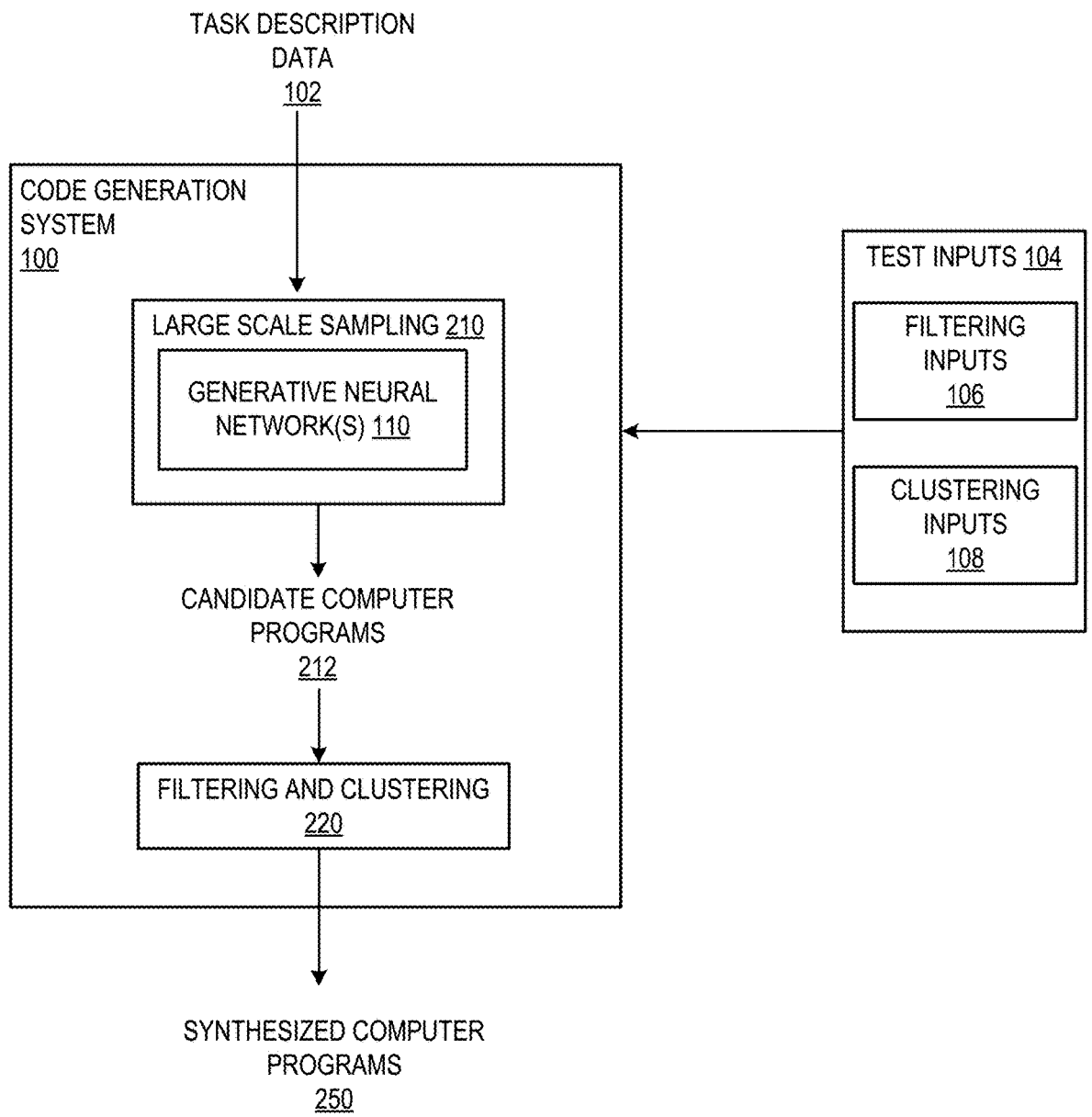
FIG. 2A shows the operation of the code generation system.

FIG. 2A illustrates the operations performed by the system 100 to generate one or more synthesized computer programs 250.

The system 100 receives task description data 102 and then performs large scale sampling 210 on the task description data 202 using the generative neural network(s) 110 to generate a large set of candidate computer programs 212. For example, the system 100 can continue sampling 210 until a compute budget allocated for the sampling is exhausted or until a threshold number of samples have been generated.

In other words, the system 100 uses the task description data and the generative neural network(s) 110 to generate a large set of different candidate computer programs 212.

That is, the system 100 generates one or more input sequences that each include the text tokens in the description data 102 and, for each generated input sequence, samples a respective set of output sequences from each of one or more of the generative neural networks 110 while the generative neural network 110 is conditioned on the generated input sequence.

The system 100 can use any appropriate technique for sampling from an auto-regressive model sample from a given generative neural network 110 while the neural network 110 is conditioned on the description data, e.g., nucleus sampling, reduced temperature sampling, greedy sampling, and so on.

In some implementations, each input sequence includes only the text tokens in the description data 102, and the system 100 relies on the stochastic nature of the sampling from a given neural network 110, the different outputs generated by different neural networks 110, or both to generate diverse candidates.

In some other implementations, each input sequence also includes "metadata" tokens that characterize desired properties of the output sequence. For example, these metadata tokens can be inserted before or after the description data 102 in the input sequence and can be formatted according to a specified format.

The metadata tokens can include tokens that specify any of a variety of properties of a computer program.

As one example, the metadata tokens can include one or more tokens identifying a programming language that the computer program is to be written in. For example, these tokens can be formatted as the tokens "LANGUAGE IS" followed by the name of a programming language, e.g., "Python" or "C++".

As another example, the metadata tokens can include one or more tokens indicating whether the output sequence generated by the generative neural network should specify a correct or incorrect solution for the computer programming task. For example, these tokens can be formatted as "CORRECT SOLUTION" when a correct solution is desired and "INCORRECT SOLUTION" when an incorrect solution is desired.

As another example, the metadata tokens can include one or more tags that each identify an algorithm that should be implemented by the output sequence generated by the generative neural network, e.g., "divide and conquer", "dynamic programming", and "data structures." For example, these tokens can be formatted as "TAGS:" followed by identifiers for any algorithms that should be implemented. For some inputs, the input sequence can include zero tags, e.g., when no algorithm is well-adapted to the current task.

As another example, the metadata tokens can include one or more tokens that identify a difficulty rating for the task, e.g., as a numerical rating between on a predefined rating scale "divide and conquer", "dynamic programming", and "data structures." For example, these tokens can be formatted as "RATING:" followed by a numerical value.

During training, when generating an input sequence, the system 100 generates these metadata tokens to match the actual properties of the output sequence that is provided as a target for the current input sequence. That is, the system includes metadata that indicates whether the program in the training example is a correct solution to the description represented by the input sequence in the training example, the actual difficulty rating for the task described by the input sequence, the actual computer language that the program in the training example is written in, the actual algorithms that are implemented within the program in the training example or that have otherwise been determined to be useful to the task described in the input sequence, and so on.

At sampling time, however, i.e., after the neural network(s) 110 have been trained, the system 100 can use "metadata conditioning" to improve the diversity and accuracy of the candidate programs 122.

That is, at sampling time, because the final computer program has not been generated yet, the system 100 does not have access to the final computer programs that have been generated and therefore does not have access to the actual properties of the final computer programs.

Instead, the system 100 uses "metadata conditioning" to, for each input sequence that is generated, select values for the properties that will result in metadata that generates high quality and diverse candidate programs 122.

As one example, when the metadata tokens include one or more tokens identifying a programming language that the computer program is to be written in, the system 100 can, each time a current input sequence is being generated, sample a programming language from a distribution over a set of programming languages and include one or more tokens identifying the programming language in the current input sequence.

As another example, when the metadata tokens include one or more tokens indicating whether the output sequence generated by the generative neural network should specify a correct or incorrect solution for the computer programming task, the system 100 can, each time a current input sequence is being generated, include, in the current input sequence, one or more tokens indicating that the output sequence generated by the generative neural network should specify a correct solution for the computer programming task, i.e., because candidate programs 122 that are not correct solutions are not useful at sampling time.

As another example, when the metadata tokens include one or more tags that each include one or more tokens that identify an algorithm that should be implemented by the output sequence generated by the generative neural network, the system 100 can, each time a current input sequence is being generated, sample one or more tags from a distribution over a set of tags and include the sampled tags in the current output sequence.

As another example, when the metadata tokens include one or more tokens that identify a difficulty rating for the task, the system 100 can select a difficulty rating for the computer programming task and include one or more tokens specifying the selected difficulty rating in the current output sequence.

For example, the system 100 can either select a fixed difficulty rating that is the same for all computer programming tasks after training of the generative neural network(s) 110 or sample a difficulty rating from a distribution over a set of difficulty ratings and use the sample difficulty rating as the selected difficulty rating.

Thus, to generate the candidate programs 122, i.e., to sample the plurality of output sequences that represent the candidate programs 122, the system 100 repeatedly performs the following operations: (i) generating a current input sequence from the description data 102 and (ii) sampling one or more output sequences by processing the current input sequence using one of the generative neural networks 110 in the set. When "metadata conditioning" is employed, the system 100 performs "metadata conditioning" as part of generating the current input sequence.

In some implementations, the system 100 performs repeatedly performs multiple instances of the generating of the candidates and the sampling of the output sequences in parallel. For example, the system can use a plurality of parallel processing devices, e.g., CPUs, GPUs, TPUs, or other ASICs, FPGAs, and so on, to perform the generation and sampling in parallel. As a particular example, the system 100 can deploy multiple instances of each of the one or more generative neural networks 110 across the devices. For example, the system 100 can deploy each instance on a different device or deploy an instance across multiple devices using model parallelism techniques. The system 100 can then, for each instance, sample candidates as described above using the instance in parallel with each other instance.

In some of these implementations, the system 100 can also perform the execution of the candidate programs 122 in parallel across the multiple devices, e.g., by executing each candidate generated by a given instance on the device(s) on which the instance is deployed.

In the example of FIG. 2A, the system 100 receives a set of inputs that includes filtering inputs 106 and clustering inputs 108.

The system then performs filtering and clustering 220 on the set of candidate computer programs 212 to select the one or more synthesized computer programs 250.

Generally, as part of performing the filtering and clustering 220, for each candidate computer program in a subset of the candidate computer programs 122 and for each input in the one or more sets of inputs 104, the system 100 executes the candidate computer program on the input to generate an output. As described above, if a given candidate fails to compile or cannot be interpreted, the system 100 removes the candidate from consideration.

Optionally, the system 100 can maintain data specifying criteria for latency or resource consumption or both. If the execution of any given candidates fails any of the criteria, the system 100 removes the candidate from consideration. Thus, the system 100 can ensure that the synthesized programs 250 remain resource-efficient.

The system 100 then selects, from the candidate computer programs 122, one or more computer programs as synthesized computer programs 250 for performing the computer programming task based at least in part on the outputs generated by executing the candidate computer programs in the subset on the inputs.

In particular, when the one or more sets include the filtering inputs 106, the subset (of candidate computer programs 122 that are executed on the inputs) is generally not a proper subset. That is, the subset includes all of the plurality of candidate computer programs 122.

The system can then, for each candidate computer program and for each of the filtering inputs 106, determine whether the output generated by executing the candidate computer program on the filtering input 106 matches the respective expected output for the filtering input 106.

The system 100 can then select, as an initial set of computer programs, only candidate computer programs that, for each filtering input 106, generated an output that matched the respective expected output for the filtering input 106 when executed on the filtering input 106.

When the one or more sets also include clustering inputs 108, the system 100 can then cluster the candidate computer programs in the initial set into a plurality of clusters based on the outputs generated by executing the candidate computer programs on the clustering inputs. The system can use any appropriate clustering technique to cluster candidate computer programs based on outputs generated by the clustering inputs. For example, the system 100 can group two candidates into the same cluster only if the two candidates generated matching outputs for at least a threshold proportion of the clustering inputs.

The system 100 can then select, as a synthesized computer program 250, one or more respective candidate computer programs from each of one or more of the clusters.

As a particular example, the system 100 can select, as a synthesized computer program 250, one or more respective computer programs from each of a predetermined number of largest clusters of the plurality of clusters, where the size of a cluster is determined based on the number of candidates in the cluster. Selecting the synthesized computer program 250 in this manner leverages the fact that while there are many ways solutions can be incorrect, correct solutions tend to behave the same and so are grouped into larger clusters.

In other examples, the system 100 only receives filtering inputs 106. In these cases, the system 100 can select the one or more synthesized programs 250 from the initial set, e.g., by selecting a fixed number at random or based on one or more heuristics, e.g., program length and so on.

In yet other examples, the system 100 receives only clustering inputs 108. In these cases, the system 100 can cluster all of the candidate programs as described above instead of clustering only those programs in the initial set.

In some implementations, the system 100 receives all of the clustering inputs 108 as input from a user. In some other implementations, instead of or in addition to receiving clustering inputs 108 as input, the system 100 can generate one or more "synthetic" clustering inputs 108.

In particular, the system 100 can process one or more description sequences that each include the plurality of text tokens from the description data 102 using a test input generation neural network that is configured to process each description sequence to generate as output one or more test inputs for the computer programming task described by the description sequence. While these synthetic inputs are not guaranteed to be valid, especially when tasks have complex constraints, imperfect and even invalid test inputs can still be useful for grouping candidate programs.

Training the test input generation neural network is described below with reference to FIG. 4.

Figure 2B:
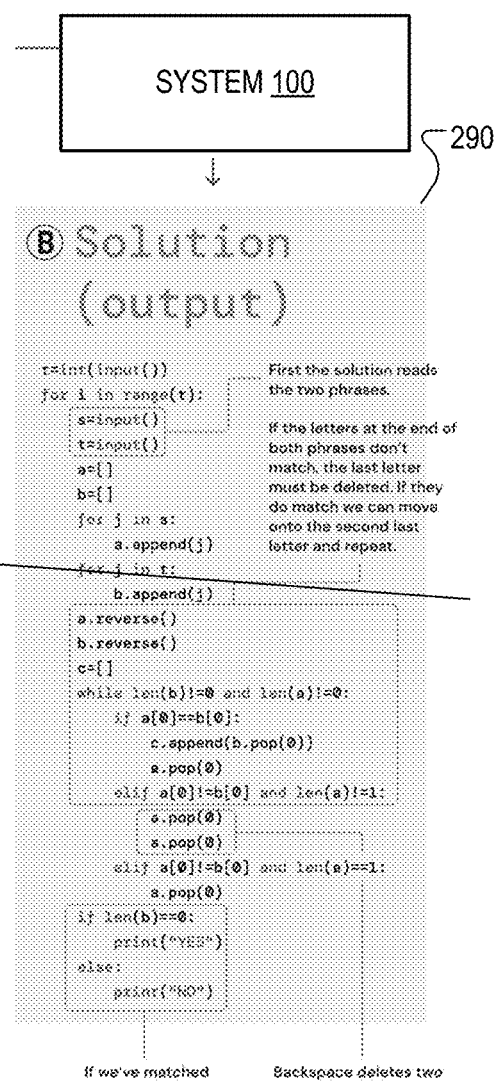
FIG. 2B shows an example of a computer program that has been generated by the system.

FIG. 2B shows an example of a computer program 290 that has been generated by the system.

As shown in FIG. 2B, a user provides description data 252 describing the problem, i.e., the task in natural language. The user also provides a set of filtering inputs 254 and an expected output for each filtering inputs.

In the example of FIG. 2B, each filtering input 254 is a pair of strings and the expected output 256 for the pair of strings indicates whether or not one string can be obtained from the other string by pressing "backspace" instead of typing one or more of the characters in the first string. The system 100 processes an input sequence that includes the description data 252, optionally including the filtering inputs 254 and the notes 256 about the filtering inputs using the neural network 110 to generate candidate programs and then filters the candidates using at least the filtering inputs 254 to arrive at the synthesized computer program 290. That is, in some cases, the filtering inputs 254 are considered part of the description data 252 in addition to being used to filter candidate programs. As can be seen from FIG. 2B, the synthesized computer program 290 accurately carries out the task described in the description data 252.

Figure 3:
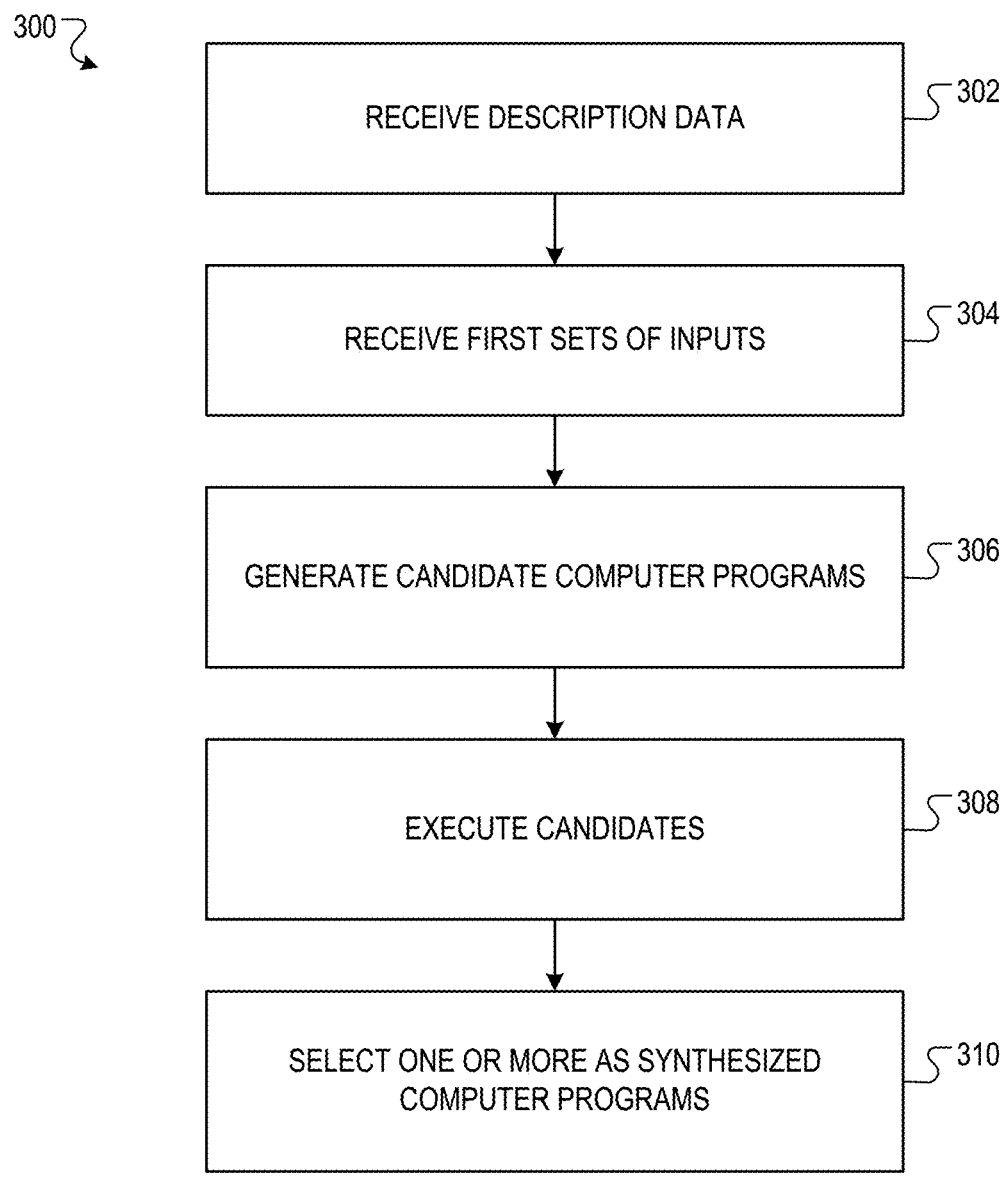
FIG. 3 is a flow diagram of an example process for generating computer code.

FIG. 3 is a flow diagram of an example process 300 for generating one or more synthesized computer programs for performing a task. For convenience, the process 300 will be described as being performed by a system of one or more computers located in one or more locations. For example, a code generation system, e.g., the code generation system 100 depicted in FIG. 1, appropriately programmed in accordance with this specification, can perform the process 300.

The system receives description data describing a computer programming task (step 302). As described above, the description data includes a plurality of text tokens that describe the task.

The system receives a first set of inputs for the computer programming task (step 304).

The system generates a plurality of candidate computer programs by sampling a plurality of output sequences from a set of one or more generative neural networks (step 306). As described above, each generative neural network in the set is configured to receive an input sequence that includes the plurality of text tokens in the description data and to process the input sequence to generate an output sequence that includes a plurality of computer code tokens that specifies a candidate computer program for performing the computer programming task described by the description data.

For each candidate computer program in the subset of the candidate computer programs and for each input in the first set, the system executes the candidate computer program on the input to generate an output (step 308).

The system selects, from the candidate computer programs, one or more computer programs as synthesized computer programs for performing the computer programming task based at least in part on the outputs generated by executing the candidate computer programs in the subset on the inputs in the first set of inputs (step 310). That is, the system uses the first set of inputs to "filter" the candidate computer programs to select the one or more synthesized computer programs.

As described above, prior using the generative neural network(s) to generate computer code, the system or a different training system trains the generative neural network(s).

For example, the system can pre-train each generative neural network on a language modeling objective on a first set of training data and then fine-tune the generative neural network on a code generation objective on a second set of training data. This is described in more detail below with reference to FIG. 4.

Figure 4:
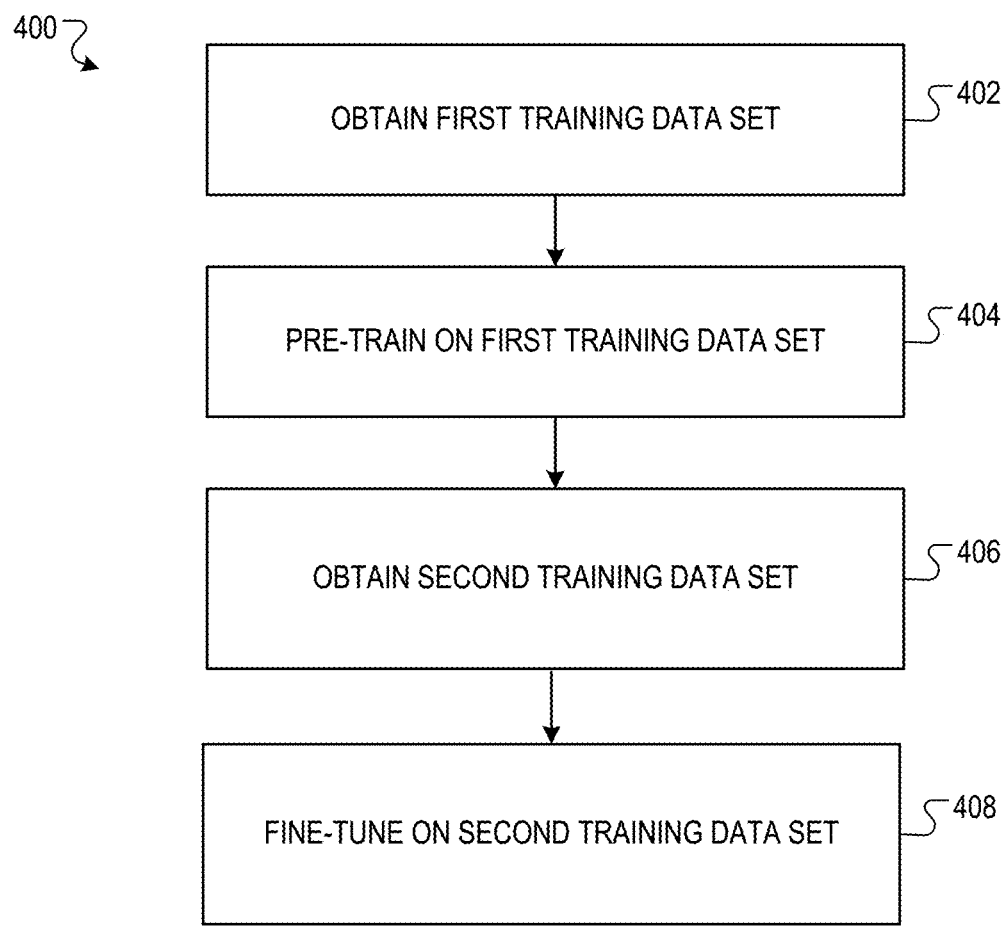
FIG. 4 is a flow diagram of an example process for training the generative neural network.

FIG. 4 is a flow diagram of an example process 400 for training a generative neural network. For convenience, the process 400 will be described as being performed by a system of one or more computers located in one or more locations. For example, a code generation system, e.g., the code generation system 100 depicted in FIG. 1, appropriately programmed in accordance with this specification, can perform the process 400.

The system obtains a first set of training data (step 402).

The first set of training data includes set of sequences that each represent a segment of computer code.

For example, the system can obtain a repository of computer code segments, e.g., computer code files or portions of computer code files, that includes compute code segments written in multiple computer programming languages. The system can then generate the first set of training data by "flattening" each computer code segment into a sequence, e.g., by removing white space or by replacing white space with a designated token.

Thus, the first set of training data includes sequences representing computer code but does not include any task descriptions describing the task that was accomplished by a given computer code segment (apart from any task information that would be embedded in comments within the computer code segment).

The system pre-trains the generative neural network on the first set of training data (step 404).

In particular, the system trains the generative neural network on the first set of training data on a language modeling objective that requires the generative neural network to predict, given a subsequence of tokens from a given sequence in the first set of training data, the tokens that follow the given subsequence of tokens within the given sequence.

For example, when the neural network has an encoder-decoder architecture as described above, the system can sample a pivot point within each sequence. The system can then generate a training example that includes, as input, the tokens before the pivot point in the sequence and, as a target output, the tokens after the pivot point in the sequence.

The language modeling objective can then require the neural network to predict the target output in each training example by processing the input sequence in the training example.

For example, the language modeling objective can be a cross-entropy next-token prediction loss for the decoder given the encoded representations of the input sequence in the training example generated by the encoder.

Optionally, the system can include one or more auxiliary losses as part of the pre-training.

For example, the system can incorporate a masked language modeling loss on the predictions of the encoder during the pre-training. Masked language modeling losses are described in more detail in J. Devlin, M.-W. Chang, K. Lee, and K. Toutanova. BERT: Pre-training of deep bidirectional transformers for language understanding. arXiv preprint arXiv:1810.04805, 2018.

While the pre-training data set does not include task descriptions and therefore does not directly train the generative neural network to perform the code generation task, the pre-training stage can help the generative neural network to learn good representations of code and to generate code fluently. As a result, the model can reasonably represent the space of human coding, which greatly reduces the problem search space.

The system obtains a second training data set for fine-tuning the generative neural network (step 406).

The second training data set includes a plurality of training examples that each include (i) a training input sequence representing a computer programming task and (ii) a training output sequence that represents a computer program.

As described above, in some implementations, after training, the inputs to the generative neural network include "metadata" tokens that each specify properties of the output sequence to be generated by the neural network.

In these implementations, the system also augments each training input sequence with metadata tokens that specify the corresponding actual properties of the computer program represented by the output sequence in the training example.

In some of these implementations, the system can leverage this metadata to allow the system to incorporate incorrect computer programs into the training.

In particular, the training examples can include both a) a first subset of training examples for which the training output sequence in the training example is a correct solution to the computer programming task represented by the training input sequence in the training example and b) a second set of training examples for which the training output sequence in the training example is not a correct solution to the computer programming task represented by the training input sequence in the training example. For each training example in a), the system includes metadata tokens indicating a correct solution while for each training example in b), the system includes metadata tokens indicating an incorrect solution. This provides an additional training signal and allowing use of data which could otherwise mislead the model.

The system trains the generative neural network on a code generation neural network (step 408).

That is, the system trains the generative neural network on an objective that encourages the generative neural network to generate computer programs that accurately carry out the task specified by the input sequence in each training example In some implementations, the system employs "tempering" during the training. Tempering is a regularization technique that makes the token probability distribution generated by the generative neural network artificially smoother or sharper at training time by dividing the output log its of the neural network, i.e., the scores generated by the penultimate layer of the neural network, by a scalar temperature T before the softmax layer.

When tempering is employed, the system uses a temperature T between zero and one, exclusive. Using a temperature in this range can avoid overfitting to the fine-tuning dataset by making the training distribution sharper, and consequently the inference distribution smoother. For example, the system can set T equal to 0.1, 0.2, or 0.4.

In these implementations, at sampling time, the system divides the log its by another temperature T' between zero and one, exclusive. For example, the system can determine T' by tuning the value on a validation set after training.

In some implementations, the system uses maximum likelihood as the code generation objective.

In some other implementations, the system uses a GOLD objective as the code generation objective. GOLD is an offline RL algorithm which adds an off-policy importance weight to the standard maximum likelihood objective gradient. Using a GOLD objective can account for the fact that code generation based on task descriptions is inherently a one-of-many task: each task problem allows many distinct solutions that depend on algorithm choice, implementation, and so on. Standard maximum likelihood objectives minimise loss by putting some weight on each solution in the training set (like recall), whereas the goal of the system is to a single correct solution that is within the budget (like precision). GOLD can account for this by adding the off-policy importance weight, which allows the model to both learn from tokens it already assigns high likelihood to, and to ignore tokens that are not in its distribution. This way, the model can concentrate on precision rather than recall, and increase its chance of getting at least one correct sample. More specifically, the gradient of the GOLD objective satisfies:

$$\nabla \mathcal{L}_{GOLD}(\theta) = - \sum_{s \in \text{Solution tokens}} P_\theta(s) \nabla \log P_\theta(s),$$

where $\theta$ are the parameters of the generative neural network, the solution tokens are the tokens in the output sequence in the training example, and $P_\theta(s)$ is the probability assigned to token s by the generative neural network.

In some cases, to mitigate instabilities during training, the system replaces P(s) in the importance weight above with $\max(P_\theta(s)^\alpha, \beta)$, with $\alpha=12$ and $\beta=0.05$.

In some of these implementations, the objective is GOLD with tempering. In these implementations, the system can first divide the log its by the temperature before computing the loss, so both the log loss term and the importance weight use the tempered distribution. Optionally, the system can include one or more auxiliary losses as part of the fine-tuning.

For example, the system can incorporate a masked language modeling loss on the predictions of the encoder during the fine-tuning. Masked language modeling losses are described in more detail in J. Devlin, M.-W. Chang, K. Lee, and K. Toutanova. BERT: Pre-training of deep bidirectional transformers for language understanding. arXiv preprint arXiv:1810.04805, 2018.

As another example, the system can incorporate a value prediction auxiliary task into the training of the decoder. In this example, the last layer token representations before projecting to log its are also used in a prediction head, e.g., a small Transformer, to classify whether the generated computer program is correct or incorrect.

When the test input generation neural network is used at inference time, the test input generation neural network can also have an encoder-decoder architecture like the generative neural network. In particular, the system can train the test input generation neural network starting from the pre-trained generative neural network after step 404, but can use a different fine-tuning objective. In particular, the fine-tuning objective can be to predict test inputs from problem descriptions, using known test inputs as target outputs. For example, the objective can be a maximum log likelihood objective.

As described above, the system can make any of several adjustments to the training and sampling process in order to improve the performance of the system. Table 2 shows the impact of some of these adjustments on the performance on the system on a task that requires submitting 10 synthesized programs for each natural language description and is determined to be successfully performs when one or more out of the 10 programs successfully performs the task.

TABLE 2

| Setting | Solve rate |
|---|---|
| +No enhancements | 19.6% (18.2-20.4) |
| +Masked language modeling | 20.7% (19.1-21.3) |
| +Tempering | 21.9% (21.3-23.0) |
| +Random tags and ratings | 22.4% (21.3-23.0) |
| +Value prediction | 23.2% (21.7-23.9) |
| +GOLD | 24.2% (23.1-24.4) |
| +Clustering | 28.4% (27.5-29.3) |

Each row of Table 2 shows the solve rate of a system that uses the adjustment named in the row and all of the adjustments named in any rows above the row, with numbers in parentheses being a 95% confidence interval for the solve rate. The "solve rate" is the percentage of inputs for the above-described task for which the system generated a successful program. Row 2, "no enhancement," corresponds to using a neural network fine-tuned with standard next-token prediction loss (no GOLD or tempering and no masked language modeling or value prediction auxiliary losses at training and no clustering at sampling time). The last row, on the other hand, corresponds to using the "no enhancements" system but with masked language modeling, tempering, random tags and ratings (using "meta data conditioning" with randomly selected tags and ratings as described above), value prediction, GOLD, and clustering at sampling time. As can be seen from Table 2, each adjustment improves the performance of the system relative to a system that does not include the adjustment.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, e.g., inference, workloads.

Machine learning models can be implemented and deployed using a machine learning framework, e.g., a TensorFlow framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   receiving description data describing a computer programming task, the description data comprising a plurality of text tokens;
   receiving a first set of inputs for the computer programming task;
   generating a plurality of candidate computer programs by sampling a plurality of output sequences from a set of one or more generative neural networks, wherein each generative neural network in the set is deployed as a plurality of instances on a respective set of one or more devices, and wherein each instance of each generative neural network in the set is configured to, in parallel with each other instance of each generative neural network, receive an input sequence that includes the plurality of text tokens in the description data and to process the input sequence to generate an output sequence comprising a plurality of computer code tokens that specifies a candidate computer program for performing the computer programming task described by the description data;

for each candidate computer program in a subset of the candidate computer programs and for each input in the first set:
    executing the candidate computer program on the input on the respective set of one or more devices on which the instance that generated the candidate computer program is deployed to generate an output; and
selecting, from the candidate computer programs, one or more computer programs as synthesized computer programs for performing the computer programming task based at least in part on the outputs generated by executing the candidate computer programs in the subset on the inputs in the first set of inputs, comprising:
    clustering the candidate computer programs in the subset into a plurality of clusters based on the outputs generated by executing the candidate computer programs on the inputs in the first set; and
    selecting, as a synthesized computer program, one or more respective candidate computer programs from each of one or more of the clusters.

2. The method of claim 1, further comprising:
receiving a new input for the computer programming task; and
executing one or more of the synthesized computer programs on the new input to generate an output for the computer programming task for the new input.

3. The method of claim 1, further comprising:
receiving, for each input in the first set, a respective expected output generated by performing the computer programming task on the input, wherein the selecting comprises:
for each candidate computer program in the subset and for each input in the first set:
    determining whether the output generated by executing the candidate computer program on the input matches the respective expected output for the input; and
selecting, as an initial set of computer programs, only candidate computer programs that, for each input in the first set, generated an output that matched the respective expected output for the input when executed on the input;
wherein selecting, from the candidate computer programs, one or more computer programs as synthesized computer programs for performing the computer programming task based at least in part on the outputs generated by executing the candidate computer programs in the subset on the inputs in the first set of inputs comprises selecting, as a synthesized computer program, one or more respective computer programs from the initial set of computer programs.

4. The method of claim 1, wherein the subset of candidate computer programs includes all of the plurality of candidate computer programs.

5. The method of claim 1, wherein selecting, as a synthesized computer program, one or more respective computer programs from each of one or more of the clusters comprises:
selecting, as a synthesized computer program, one or more respective computer programs from each of a predetermined number of largest clusters of the plurality of clusters.

6. The method of claim 1, wherein obtaining the first set of inputs for the computer programming task comprises:
processing one or more description sequences that each include the plurality of text tokens from the description data using a test input generation neural network that is configured to process each description sequence to generate as output one or more test inputs for the computer programming task described by the description sequence.

7. The method of claim 1, wherein the subset of candidate computer programs includes only candidate computer programs that were not filtered out from the plurality of candidate computer programs based on, for each candidate computer program and for each input in a second set of inputs, whether the output generated by executing the candidate computer program on the input matched a respective expected output for the input.

8. The method of claim 1, wherein the set of one or more generative neural networks includes only a single generative neural network.

9. The method of claim 1, wherein the set of one or more generative neural networks includes a plurality of generative neural networks, wherein each generative neural network in the set has a different combination of values for a set of one or more properties than each other neural network in the set, and wherein the properties include one or more of (i) training data used to train the generative neural network, (ii) a number of parameters of the generative neural network, or (iii) a sampling temperature for sampling output sequences from the generative neural network.

10. The method of claim 1, wherein one or more of the generative neural networks in the set include:
an encoder neural network configured to process the input sequence to generate an encoded representation of the input sequence; and
a decoder neural network configured to process the encoded representation to generate the output sequence.

11. The method of claim 10, wherein the encoder neural network is a Transformer encoder that applies self-attention over the input sequence and the decoder neural network is an auto-regressive Transformer decoder that applies cross-attention into the encoded representation.

12. The method of claim 1, wherein generating a plurality of candidate computer programs by sampling a plurality of output sequences from a set of one or more generative neural networks comprises repeatedly performing operations comprising:
generating a current input sequence from the description data; and
sampling one or more output sequences by processing the current input sequence using one of the generative neural networks in the set.

13. The method of claim 12, wherein each input sequence comprises the plurality of text tokens from the description data and one or more tokens identifying a programming language, and wherein generating a current input sequence from the description data comprises:
sampling a programming language from a distribution over a set of programming languages; and
including one or more tokens identifying the programming language in the current input sequence.

14. The method of claim 12, wherein each input sequence comprises the plurality of text tokens from the description data and one or more tokens indicating whether the output sequence generated by the generative neural network should specify a correct or incorrect solution for the computer programming task, and wherein generating a current input sequence from the description data comprises:
  including one or more tokens indicating that the output sequence generated by the generative neural network should specify a correct solution for the computer programming task.

15. The method of claim 12, wherein each input sequence comprises the plurality of text tokens from the description data and zero or more tags that each comprise one or more tokens and that identify an algorithm that should be implemented by the output sequence generated by the generative neural network, and wherein generating a current input sequence from the description data comprises:
  sampling one or more tags from a distribution over a set of tags; and
  including the sampled tags in the current output sequence.

16. The method of claim 12, wherein each input sequence comprises the plurality of text tokens from the description data and one or more tokens that specify a difficulty rating for the computer programming task, and wherein generating a current input sequence from the description data comprises:
  selecting a difficulty rating for the computer programming task; and
  including one or more tokens specifying the selected difficulty rating in the current output sequence.

17. The method of claim 16, wherein selecting a difficulty rating for the computer programming task comprises:
  selecting a fixed difficulty rating that is the same for all computer programming tasks after training of the generative neural networks.

18. The method of claim 16, wherein selecting a difficulty rating for the computer programming task comprises:
  sampling a difficulty rating from a distribution over a set of difficulty ratings.

19. The method of claim 1, wherein each generative neural network has been pre-trained on a language modeling objective on a first set of training data and fine-tuned on a code generation objective on a second set of training data that includes a plurality of training examples that each include (i) a training input sequence representing a computer programming task and (ii) a training output sequence that represents a computer program.

20. The method of claim 19, wherein the first set of training data comprises a set of sequences that each represent a segment of computer code.

21. The method of claim 19, wherein the plurality of training examples includes a first subset of training examples for which the training output sequence in the training example is a correct solution to the computer programming task represented by the training input sequence in the training example and a second set of training examples for which the training output sequence in the training example is not a correct solution to the computer programming task represented by the training input sequence in the training example.

22. The method of claim 19, wherein the code generation objective is GOLD with tempering.

23. The method of claim 1, wherein the text tokens and the computer code tokens are selected from a same vocabulary of tokens.

24. A system comprising one or more computers and one or more storage devices storing instructions that when executed by the one or more computers cause the one or more computers to perform operations comprising:
  receiving description data describing a computer programming task, the description data comprising a plurality of text tokens;
  receiving a first set of inputs for the computer programming task;
  generating a plurality of candidate computer programs by sampling a plurality of output sequences from a set of one or more generative neural networks, wherein each generative neural network in the set is deployed as a plurality of instances on a respective set of one or more devices, and wherein each instance of each generative neural network in the set is configured to, in parallel with each other instance of each generative neural network, receive an input sequence that includes the plurality of text tokens in the description data and to process the input sequence to generate an output sequence comprising a plurality of computer code tokens that specifies a candidate computer program for performing the computer programming task described by the description data;
  for each candidate computer program in a subset of the candidate computer programs and for each input in the first set:
    executing the candidate computer program on the input on the respective set of one or more devices on which the instance that generated the candidate computer program is deployed to generate an output; and
  selecting, from the candidate computer programs, one or more computer programs as synthesized computer programs for performing the computer programming task based at least in part on the outputs generated by executing the candidate computer programs in the subset on the inputs in the first set of inputs, comprising:
    clustering the candidate computer programs in the subset into a plurality of clusters based on the outputs generated by executing the candidate computer programs on the inputs in the first set; and
    selecting, as a synthesized computer program, one or more respective candidate computer programs from each of one or more of the clusters.

25. One or more non-transitory computer-readable storage media storing instructions that when executed by one or more computers cause the one or more computers to perform operations comprising:
  receiving description data describing a computer programming task, the description data comprising a plurality of text tokens;
  receiving a first set of inputs for the computer programming task;
  generating a plurality of candidate computer programs by sampling a plurality of output sequences from a set of one or more generative neural networks, wherein each generative neural network in the set is deployed as a plurality of instances on a respective set of one or more devices, and wherein each instance of each generative neural network in the set is configured to, in parallel with each other instance of each generative neural network, receive an input sequence that includes the plurality of text tokens in the description data and to process the input sequence to generate an output sequence comprising a plurality of computer code tokens that specifies a candidate computer program for performing the computer programming task described by the description data;

for each candidate computer program in a subset of the candidate computer programs and for each input in the first set:

executing the candidate computer program on the input on the respective set of one or more devices on which the instance that generated the candidate computer program is deployed to generate an output; and selecting, from the candidate computer programs, one or more computer programs as synthesized computer programs for performing the computer programming task based at least in part on the outputs generated by executing the candidate computer programs in the subset on the inputs in the first set of inputs, comprising:

clustering the candidate computer programs in the subset into a plurality of clusters based on the outputs generated by executing the candidate computer programs on the inputs in the first set; and selecting, as a synthesized computer program, one or more respective candidate computer programs from each of one or more of the clusters.

* * * * *